US008640739B2

(12) United States Patent
Do et al.

(10) Patent No.: US 8,640,739 B2
(45) Date of Patent: Feb. 4, 2014

(54) FLEXIBLE PIPE FOR CONVEYING HYDROCARBONS AND HAVING A REINFORCED MAINTAIN LAYER

(75) Inventors: Anh Tuan Do, Cormeilles en Parisis (FR); Patrice Joël Louis Jung, La Mailleraye sur Seine (FR); Alain Coutarel, Mont Saint Aignan (FR)

(73) Assignee: Technip France (FR)

( * ) Notice: Subject to any disclaimer, the term of this patent is extended or adjusted under 35 U.S.C. 154(b) by 657 days.

(21) Appl. No.: 12/531,984

(22) PCT Filed: Mar. 21, 2008

(86) PCT No.: PCT/FR2008/000383
§ 371 (c)(1),
(2), (4) Date: Nov. 10, 2009

(87) PCT Pub. No.: WO2008/135663
PCT Pub. Date: Nov. 13, 2008

(65) Prior Publication Data
US 2010/0101675 A1    Apr. 29, 2010

(30) Foreign Application Priority Data

Mar. 21, 2007  (FR) ..................................... 07 02065
Mar. 21, 2007  (FR) ..................................... 07 02066

(51) Int. Cl.
*F16L 11/08* (2006.01)

(52) U.S. Cl.
USPC ............................. 138/130; 138/125; 138/135

(58) Field of Classification Search
USPC ......................................... 138/130, 135, 125
See application file for complete search history.

(56) References Cited

U.S. PATENT DOCUMENTS

| 1,601,092 | A | * | 9/1926 | Weigel ......................... 138/133 |
| 2,281,635 | A | * | 5/1942 | Strauss ......................... 442/39 |
| 2,969,812 | A | * | 1/1961 | De Ganahl .................... 285/238 |
| 3,116,760 | A |   | 1/1964 | Matthews |
| 4,213,485 | A | * | 7/1980 | Ottewell et al. ............... 138/130 |
| 4,241,763 | A | * | 12/1980 | Antal et al. ................... 138/127 |
| 4,421,582 | A | * | 12/1983 | Horsma et al. ................ 156/86 |
| 4,585,035 | A | * | 4/1986 | Piccoli ......................... 138/127 |

(Continued)

FOREIGN PATENT DOCUMENTS

FR           2 837 899 A1   10/2003
WO       WO 97/12753 A      4/1997

(Continued)

OTHER PUBLICATIONS

International Search Report dated Oct. 30, 2008, issued in corresponding international application No. PCT/FR2008/00383.

*Primary Examiner* — James Hook
(74) *Attorney, Agent, or Firm* — Ostrolenk Faber LLP

(57) ABSTRACT

An undersea flexible pipe for conveying hydrocarbons, the pipe including from the inside to the outside an inner sealing sheath, at least one ply of traction armors wound about the inner sealing sheath, a deformable holding layer including at least one flexible ribbon or holding band wound about the traction armor ply, and at least one tubular structure surrounding the holding layer, wherein the ribbon includes fiber strands oriented substantially in the longitudinal direction of the ribbon. The ribbon is covered by a reinforcing layer of a polymer material for the deformation resistance of the holding layer.

13 Claims, 2 Drawing Sheets

(56) References Cited

U.S. PATENT DOCUMENTS

| | | | |
|---|---|---|---|
| RE32,508 E * | 9/1987 | Feucht | 138/119 |
| 6,491,779 B1 * | 12/2002 | Bryant | 156/192 |
| 6,899,140 B2 * | 5/2005 | Fraser et al. | 138/134 |
| 6,966,344 B2 | 11/2005 | Coutarel et al. | |
| 2006/0013990 A1 * | 1/2006 | Brentrup et al. | 428/102 |
| 2006/0249215 A1 * | 11/2006 | Bryant | 138/125 |

FOREIGN PATENT DOCUMENTS

| | | |
|---|---|---|
| WO | WO 97/13091 | 10/1997 |
| WO | WO 2005/043020 A | 5/2005 |
| WO | WO 2006/005689 A | 1/2006 |

* cited by examiner

FLEXIBLE PIPE FOR CONVEYING HYDROCARBONS AND HAVING A REINFORCED MAINTAIN LAYER

CROSS REFERENCE TO RELATED APPLICATION

The present application is a 35 U.S.C. §§371 national phase conversion of PCT/FR2008/000383, filed Mar. 21, 2008, which claims priority of French Application Nos. 0702065, filed Mar. 21, 2007, and 0702066, filed Mar. 21, 2007, the disclosure of which is incorporated by reference herein. The PCT International Application was published in the French language.

BACKGROUND OF THE INVENTION

The present invention relates to a subsea flexible pipe for transporting oil and gas in deep waters.

Flexible pipes for transporting oil and gas are already well known, and they generally comprise, from the inside to the outside of the pipe, a metal carcass, an inner impervious polymer sheath, a pressure arch, laps of traction armor, and an outer polymer sheath for protecting the overall pipe and in particular for preventing seawater from entering into its thickness. The metal carcass and the pressure arch consist of longitudinal elements wound in a short pitch, and they give the pipe its resistance to radial forces, while the laps of traction armor consist of metal wires wound in long pitches to absorb the axial forces. The type, number, dimensions and organization of the layers constituting the flexible pipes are essentially related to their conditions of use and installation. In the present application, the concept of short pitch winding designates any helical winding at a helix angle close to 90°, typically between 75° and 90°. The concept of long pitch winding covers helix angles lower than 55°, typically between 25° to 55° for the armor laps.

These flexible pipes are suitable for transporting oil and gas, in particular on the seabed, and at great depths. More precisely, they are referred to as unbonded and are so described in the standards published by the American Petroleum Institute (API), API 17J and API RP 17B.

When the flexible pipe, regardless of its type, is subjected to an external pressure that is higher than the internal pressure, an axial compression may be generated, which is known to a person skilled in the art as the reverse end cap effect. The reverse end cap effect tends to compress the flexible pipe axially, to shorten its length and to increase its diameter, thereby tending to cause a swelling of the traction armor laps. In the case in which the outer sheath of the pipe is impervious, the hydrostatic pressure prevailing outside the pipe effectively opposes the swelling of the traction armor. However, if the outer sheath is no longer impervious, for example due to an accidental tear, the hydrostatic pressure no longer opposes the swelling of the traction armor laps. In consequence, in the absence of additional means for limiting this swelling, the wires of the traction armor laps may buckle in a radial mode, thereby possibly causing an irreversible local deformation of said armor laps having a "birdcage" shape, and thus causing the failure of the pipe.

One known solution for reducing this "birdcage" radial buckling risk consists of a short pitch winding, around the traction armor laps, of bands reinforced with aramide fibers, and more precisely, fibers sold under the Kevlar® trademark by du Pont de Nemours. Such bands have high tensile strength along their longitudinal axis, thereby serving to limit the swelling of the traction armor laps. They also have great bending flexibility, thereby facilitating the handling and winding operations around the armor laps. Finally, at equivalent mechanical characteristics, they are much lighter than metal bands, thereby serving to reduce the weight of the flexible pipe. Reference can be made in particular to document FR 2 837 899 in which such a pipe is disclosed.

These reinforcing bands are in the form of bundles of fiber strands or filamentary strands of Kevlar® oriented parallel to the longitudinal axis of the band. These longitudinal fiber strands may be joined to one another in the form of a relatively flat bundle having a substantially rectangular cross section like that of a ribbon or a tape. It is also possible to use a reinforcing band consisting of a substantially rectangular central section and two longitudinal edges that are thinner than the central section as described in document EP1419338. The means for joining and retaining these fiber strands or filamentary strands generally comprise crosswise elements that are shaped so as to surround and grip all of said strands in order to form a relatively flat bundle. In common configurations, these crosswise elements are treated as weft yarns, the filamentary strands forming the warp, and the band can then be considered as a woven material. Various embodiments of these reinforcing bands are described in documents WO97/12753 and WO9713091.

However, it has been found, despite this, that in extreme service conditions these reinforcing bands could be damaged. These extreme conditions are mainly encountered when the flexible pipe is, on the one hand, submerged to great depth, typically over 2000 m, and on the other hand, simultaneously subjected to dynamic bending loads, causing fatigue of the reinforcing bands. These conditions may be satisfied in the lower portion of the flexible risers arranged in a catenary, and connecting the seabed with a floating support at the surface. Due to the movements of the floating support, the lower part of the catenary may be subjected to wide variations in curvature. Moreover, this dynamic zone is located close to the touch down point, that is, potentially at great depth.

SUMMARY OF THE INVENTION

Accordingly, a problem that arises and which the present invention proposes to solve, is to provide a subsea flexible pipe which can withstand these extreme conditions of depth and dynamic bending loads, and for which the swelling of the traction armor can be durably contained to prevent the "birdcage" radial buckling.

For the purpose of solving this problem, the present invention provides a subsea flexible pipe for transporting oil and gas, said flexible pipe comprising, from the inside to the outside, an inner impervious sheath, at least one lap of traction armor wound around said inner impervious sheath, a deformable holding layer comprising at least one flexible holding band wound around said lap of traction armor, and at least one tubular structure surrounding said holding layer, said holding band comprising strands of fibers, said strands being oriented substantially in the longitudinal direction of said holding band, and according to the invention, said holding band is covered with a reinforcing layer of polymer material to increase the deformation resistance of said holding layer.

Thus, one feature of the invention resides in the use of the holding band and the polymer reinforcing layer, which together serve to increase the overall bending stiffness of the covered holding band, and hence the deformation resistance of the holding layer. In fact, it has been discovered that this feature serves to significantly increase the service life of the holding layer of the flexible pipe, when the latter is submerged at great depth, and simultaneously subjected to dynamic bending loads.

Lengthy and meticulous tests were required to understand the damage mechanisms of the holding layer and to develop the present invention. These tests were technically difficult to perform, because it was necessary to conduct full scale tests of sections of flexible pipe by subjecting them simultaneously to a very high external pressure and variations in curvature.

This invention has a surprising character and is at odds with several prejudices of the person skilled in the art. In fact, the latter naturally considered that the greater the depth, the higher the reverse end cap effect, and hence, the means for preventing the swelling of the traction armor laps must be stronger. In fact, when the holding layer performs its function of limiting the swelling of the traction armor laps, the holding band is mainly under tensile loading in a direction substantially parallel to its longitudinal axis, that is that of the fiber strands. Accordingly, a person skilled in the art had previously sought to maximize the tensile strength of the holding bands. Moreover, in order to facilitate the fabrication of the holding layer, he had also attempted to minimize the bending stiffness of the holding band, thereby serving to carry out the winding operation with a low power taping device. In fact, the present invention is at odds with these two practices, because the fact of covering the holding band with a polymer reinforcing layer leads on the one hand to a lowering of its mechanical tensile strength, at equivalent cross section (larger cross section and equivalent quantity of fiber strands), and on the other hand to an increase in its bending stiffness.

Thus the polymer reinforcing layer increases the bending stiffness of the holding band, thereby surprisingly limiting the abovementioned fatigue mechanism.

The polymer reinforcing material layer is advantageously made from polyamide, polyethylene or polypropylene, or even polyester; fluorinated polymers such as PVDF are also suitable. The suitable polymers are preferably thermoplastic.

Moreover, the holding band is advantageously oriented so that the reinforcing layer is directly in contact with the armor. Thus, the fiber strands are protected from wear by friction against the armor.

According to a particular embodiment of the invention, said reinforcing layer and said holding band penetrate into one another at least partially, in order to obtain perfect cohesion of the reinforcing layer and the holding band. In this way, the mechanical properties of the holding band, in terms of tensile strength, are preserved so that the reinforcing layer is protected from the tensile loads that are applied to it, and said reinforcing layer can then perform its role by stiffening the holding band.

Furthermore, said fibers have an elastic modulus higher than 50 GPa at ambient temperature. The elastic modulus is measured by a tensile test according to standard ASTM D885-04. This test is performed not on an individual fiber, but on a yarn consisting of 500 to 2500 identical fibers or filaments having the same length. The twist of the yarn used for the test is less than 100 turns per meter and, for example, about 60 turns per meter, thereby improving the reproducibility and accuracy of the measurements, in agreement with the recommendations of the abovementioned standard. The jaw spacing at the start of the tensile test is about 400 mm. The tensile loading rate is about 50 mm/min. The ambient temperature at which these tests are performed is about 18° C. to 23° C.

In consequence, thanks to this elastic modulus, the fiber strands, and hence the covered holding band, absorb without excessive elongation the tensile loads applied substantially tangentially to the holding band, and prevent the swelling of the armor laps. The suitable fibers for producing such strands are organic fibers, for example fibers of aramide or high performance polyethylene, or even polyester. Such fibers further, and advantageously, have an elongation at break higher than 2%, for example 2.5%. This elongation at break is measured by a tensile test according to the abovementioned standard ASTM D885-04.

Furthermore, since said fiber strands comprise core fibers surrounded by surface fibers, a portion of said surface fibers is embedded in said polymer material of said reinforcement layer to join said reinforcing layer to said holding band. In this way, the polymer reinforcing layer adheres strongly to the holding band rather due to a mechanical bond by fiber encasement than to a chemical bond. The polymer material extends more or less deeply into the fiber and encases at least the surface fibers.

Moreover, the holding band further and advantageously comprises retaining means for holding said fiber strands together. For example, said holding band is a woven material and the retaining means for holding the various fiber strands together then comprise at least one weft yarn woven with said strands, which constitute the warp elements. Since such weft yarns are not subjected to the tensile forces applied to the band, they can advantageously be made from a weaker material that is different from that of the fiber strands.

Furthermore, said fibers are held together, preferably grouped against one another, in order to increase their friction coefficient with regard to one another and to increase the tensile strength of the fiber strand.

Advantageously, said holding band comprises two faces opposite one another, each of said faces being covered with said reinforcing layer, in order to further increase the bending stiffness of the holding layer and thereby protect the holding band from abrasion on its two faces. Moreover, and according to another embodiment, said reinforcing layer forms a sheath around said holding band, by surrounding it and protecting it not only on the two opposite faces but also on the edge.

Furthermore, the reinforcing layer is obtained by extrusion of said polymer material. This reinforcing layer is accordingly either directly extruded on the holding band, or extruded independently and then joined to and calendered with the holding band. The embodiment of the reinforcing layer on the holding band is described in greater detail in the rest of the description.

Moreover, advantageously, a textile layer, for example a textile layer forming a mat, is inserted between the fiber strands and the reinforcing layer. The term mat designates a voile of nonwoven short fibers, generally joined by mechanical compaction and/or adhesive. In this way, the adhesion between the fiber strands and the reinforcing layer is improved.

Other features and advantages of the invention will appear from a reading of the description provided below of particular embodiments of the invention, given for information but non-limiting, in conjunction with the appended drawings in which:

DESCRIPTION OF PREFERRED EMBODIMENTS

Figure 1:
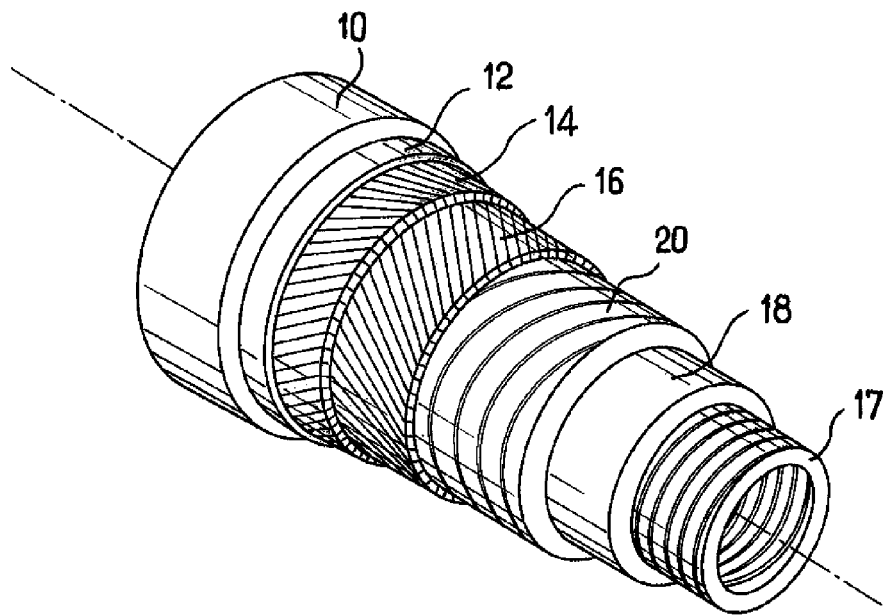
FIG. 1 is a partial schematic perspective view of a flexible pipe according to the invention.

FIG. 1 shows a pipe according to the invention comprising, from the outside to the inside, an outer impervious polymer sheath 10 (called outer sheath), a holding layer 12 described below wound around an outer lap of traction armor 14, an inner traction armor lap 16 wound in the opposite direction to the outer lap 14, a pressure arch 20 for absorbing the radial forces generated by the pressure of the transported fluid, an inner impervious polymer sheath 18 and an inner carcass 17 for absorbing the radial crushing forces. Due to the presence of the inner carcass 17, this pipe is called a rough bore pipe. The invention would also apply to a smooth bore pipe, not comprising an inner carcass. Similarly, the scope of the invention would still be satisfied by eliminating the pressure arch 20, provided that the helix angles of the yarns constituting the armor laps 14, 16 are close to 55° and in the opposite direction. The armor laps 14, 16 are obtained by long pitch winding of a set of metal wires or composite yarns, having a substantially rectangular general cross section. The invention would also apply if these wires and yarns have a circular or complex cross section, such as an interlocked T for example. In FIG. 1, only two armor laps 14 and 16 are shown, but the pipe could also comprise one or more additional pairs of laps. The armor lap 14 is referred to as outer because it is the last one here, starting from the inside of the pipe, before the outer impervious sheath 10. The holding layer 12 is generally wound around the outer lap 14, but the invention would also apply to the case of a holding layer inserted between two traction armor laps. Such a configuration is disclosed in document FR 2 837 899.

The holding layer 12 may consist of several strips, tapes, holding bands or unitary elements wound in a short pitch around the outer armor lap 14. This winding is generally abutting or overlapped in order to increase the capacity to absorb the radial swelling forces. The unitary elements of the holding layer not only have a high longitudinal tensile strength, along their longitudinal axis, but also a higher bending stiffness, which increases the deformation resistance of the holding layer.

Thus, the unitary holding elements are made from suitable materials, in the present case from a fiber holding band, covered with a polymer reinforcing layer. The holding band is made by woven or nonwoven assembly of said fibers.

This holding layer 12 is intended to block the radial expansion of said armor lap, when subjected to radial forces. This is the case when the flexible pipe, extended in a very deep seabed, is subjected to a high reverse end cap effect, and the traction armor laps 14, 16, tend to swell radially under the effect of the axial compression.

Figure 2:
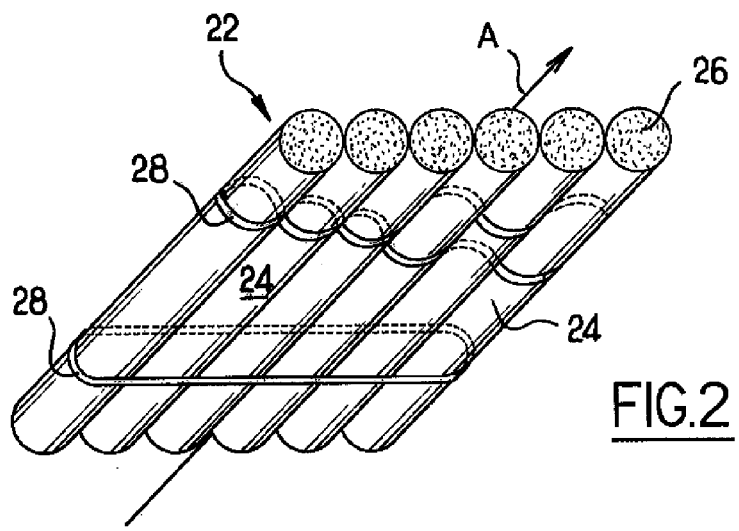
FIG. 2 is a partial schematic perspective view of an element of the flexible pipe shown in FIG. 1.

In order to prepare this holding layer, a holding band 22 shown partially in perspective in FIG. 2 is provided. This holding band 22 is capable of extending longitudinally along an axis A. The holding band 22 comprises a plurality of strands and in the present case, six strands 24 of fibers 26, the strands 24 being oriented longitudinally along the axis A of the band. The strands 24 thus consist of the assembly of fibers 26, yarns or filaments made from a high tenacity organic material, such as aramide, high performance polyethylene or even aromatic polyester. Among the aramides, mention can be made of those sold under Kevlar® trademark by du Pont de Nemours, and those sold under the Twaron® and Technora® trademarks by Teijin. Advantageously, Kevlar® 49 is selected, whereof the fibers have an elastic modulus of about 110 GPa measured according to the abovementioned standard ASTM D885-04. They are juxtaposed and held together by retaining means 28 oriented across the axis A of the holding band 22. These retaining means may comprise ties surrounding the whole, or weft yarns woven with the strands 24, the latter then constituting the warp elements. Since the retaining means do not have the function of absorbing their longitudinal tensile forces, they can be made from weaker polymers than those used for the strands 24.

Figure 3:
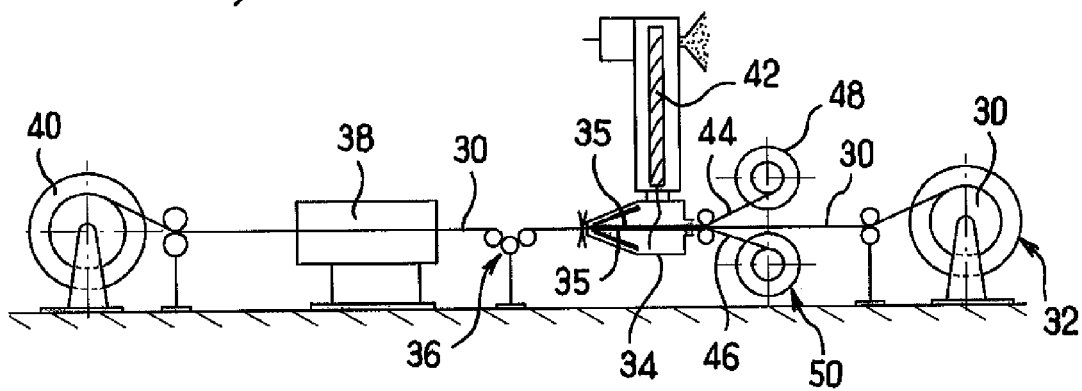
FIG. 3 is a schematic view of an installation for covering a reinforcing layer, the element shown in FIG. 2.

With reference to FIG. 3, a method of preparation is described below according to a first alternative embodiment and thanks to a suitable installation, of a holding band covered with a polymer reinforcing layer. For this purpose, a holding band 30 of the abovementioned type is provided, having a width between 50 mm and 250 mm and here for example, 75 mm, and a thickness between 0.5 mm and 5 mm and for example 1 mm, and wound on a storage reel 32. The holding band 30 passes through a square extruder head 34 where it is coated with a reinforcing layer 35, and then passes through a calender 36 so that the holding band 30 and the reinforcing layer 35 penetrate into one another; the holding band 30 thus covered is then cooled in a heat exchanger 38 and finally wound on a receiving reel 40. The extruder head 34 prolongs a die 42 which it serves to heat the polymer material to close to the melting point. Furthermore, simultaneously, two intermediate layers formed of two voiles of fibers 44, 46, or mats, delivered by rolls 48, 50, are applied to the two opposite faces of the holding band 30 before entering the extruder head 34.

The polymer materials considered are preferably thermoplastic polymers having a tensile elastic modulus higher than 300 MPa. Advantageously, the tensile elastic modulus of the polymer is also lower than 3000 MPa, and preferably lower than 1200 MPa. This range of moduli of between 300 MPa and 1200 MPa serves in practice to obtain a holding band having a sufficient bending stiffness to solve the abovementioned problem of fatigue, while avoiding an excessive stiffness that would have the unfavorable effect of making the winding of said band difficult. Thus, suitable materials include polyamides, polypropylenes, polyethylene, polyesters or even fluorinated polymers of the PVDF type. Among polyamides, suitable materials are polyamide 11, polyamide 12, polyamide 6, polyamide 6-6, polyamide 6-12; polyamide 11 is selected here.

Thus, the molten polyamide is extruded around the holding band 30 and in particular on the two fiber voiles 44, 46 as the band advances. In this way, the two fiber voiles 44, 46 consisting of short nonwoven fibers and joined by mechanical compaction and having a thickness of between 0.1 and 0.5 mm, serve to increase both the impregnation of the molten polymer and the adhesion. This is because the fiber voiles 44, 46 absorb the molten polyamide, acting as a blotter and accordingly increasing the impregnation of the fibers of the strands. Moreover, they also serve to prevent the polymer from flowing into the core of the holding band 30. In this way, despite the pressure generated by the extrusion of the polymer around the holding band 30 and thanks to the absorption of the fiber voiles, the molten polymer accurately tends to uniformly cover the two opposite faces of the holding band 30. The calendering through the calender 36, which applies a normal pressure to the covered holding band, then serves to make the cooling viscous polymer penetrate slightly into the holding band 30, and thereby to imprison the fibers after cooling in the heat exchanger 38.

Figure 4:
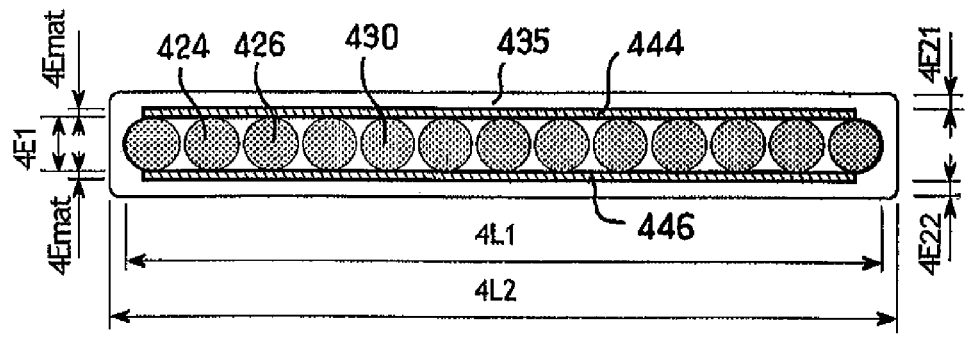
FIG. 4 is a schematic view of a cross section of the element partially shown in FIG. 2 and covered, according to a first alternative embodiment.

Reference can be made to FIG. 4 showing a cross section of the holding band 430 covered with the reinforcing layer 435. This Figure shows the circular section strands 424 consisting of fibers 426. The holding band 430 has an original thickness 4E1 corresponding substantially to the diameter of the strands 424 and about one millimeter, and a width 4L1 of about 75 mm. Moreover, the two fiber voiles 444, 446, having a thickness 4Emat of about 0.2 m, are applied to the two opposite faces of the holding band 430 and covered with the polyamide reinforcing layer 435. Thus, this reinforcing layer 435, having a thickness 4E21=4E22, forms a sheath which also covers the edge of the holding band 430. Preferably, the cumulative thickness of the reinforcing layer 435 of the two opposite faces of the holding band 430 is higher than one-third of its thickness 4E1. Advantageously, this cumulative thickness 4E21+4E22 is higher than half of the thickness 4E1. This feature gives the holding band a sufficient bending stiffness to solve the abovementioned problem of fatigue.

The fiber voiles consist of short fibers, a few millimeters long of polymer material like that of the fibers 426 of the strands 424. Thus, when the fibers 426 of the strands 424 are of Kevlar® 49 for example, the fiber voiles 444, 446 consist of aramide fibers.

Moreover, also according to this first alternative, but in another embodiment, the fiber voiles 444, 446 are previously attached by stitching to the holding band 430. In this way, it is unnecessary to use the two rolls 48, 50 shown in FIG. 3 and delivering the fiber voiles. This eliminates the need for lateral guidance of the fiber voile feed, which is difficult to implement simultaneously with the guidance of the holding band 430.

Table 1 below shows the exemplary dimensions of the covered holding band 430.

TABLE 1

| 4L1 | 50 mm | 100 mm | 200 mm |
| 4L2 | 51 mm | 102 mm | 204 mm |
| 4E1 | 0.5 mm | 1 mm | 2 mm |
| 4E21 | 0.2 mm | 0.2 mm | 0.5 mm |
| 4E22 | 0.2 mm | 0.2 mm | 0.5 mm |
| 4E21 + 4E22 | 0.4 mm | 0.4 mm | 1 mm |
| 4Emat | 0.1 mm | 0.1 mm | 0.5 mm |

The thicknesses 4E21 and 4E22 of the reinforcing layer 435 on the two opposite faces of the holding band 430 are both advantageously between 0.2 mm and 2 mm, preferably between 0.3 mm and 1.5 mm.

According to a further embodiment, not shown, and according to this first alternative, the two opposite edges of the holding band 430 are free, and the two opposite faces are covered respectively with a fiber voile and a reinforcing layer.

Figure 5:
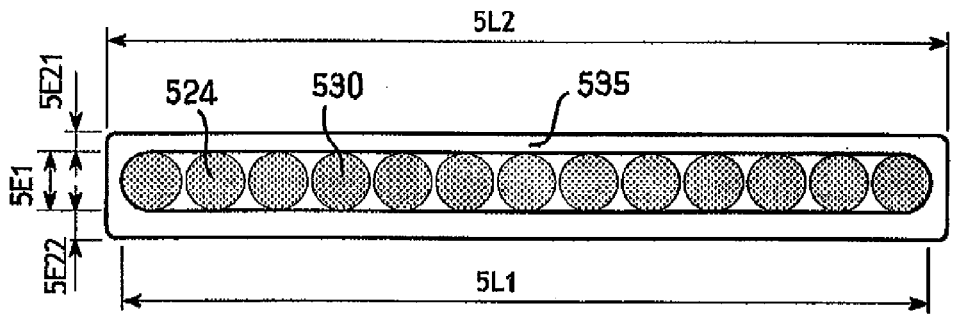
FIG. 5 is a schematic view of a cross section of the element partially shown in FIG. 2 and covered, according to a second alternative embodiment.

Reference can now be made to FIG. 5 showing a cross section of a holding band 530 covered with a reinforcing layer 535 of polymer material and made by implementing the method described with reference to FIG. 3, according to a second alternative. According to this second alternative, fiber voiles are not applied between the reinforcing layer 535 and the strands 524 of the holding band 530. Thus, the reinforcing layer 535 also forms a sheath around the holding band 530 and it is obtained by directly applying the extruded polymer to the holding band.

For this purpose, the temperature of the polymer extruded by the extruder head 34 is adjusted so that its viscosity is slightly higher, compared to the value considered to cover the holding band 530 covered with fiber voiles, as shown in FIG. 4, so as to prevent this polymer from completely flowing across the holding band 530 and in order to form a coherent layer at the surface. Obviously, the type of polymer material may also be adapted accordingly.

Figure 6:
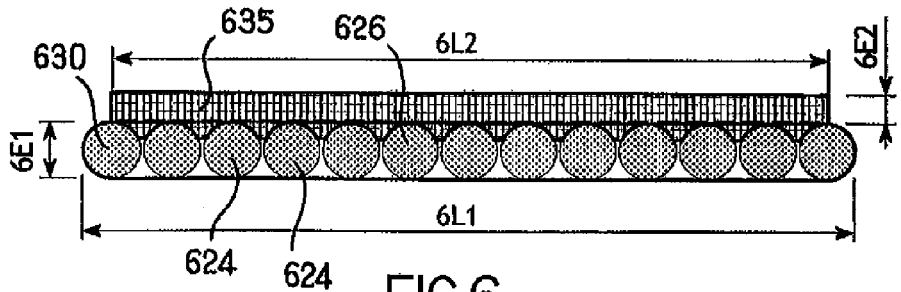
FIG. 6 is a schematic view of a cross section of the element partially shown in FIG. 2 and covered, according to a third alternative embodiment.

Reference should now be made to FIG. 6, showing a cross section in a third embodiment of a holding band 630 covered with the reinforcing layer 635 on a single face. Such a covered holding band 630 can be prepared by the method described above with reference to the installation shown in FIG. 3. However, said installation is substantially modified in order to extrude directly, and only on a single face of the holding band 630, the polymer material intended to form the reinforcing layer 635. Furthermore, it is necessary, as shown in FIG. 6, for the polymer material to flow slightly between the strands 624 in order to impregnate the largest possible number of fibers 626 and also to provide means for retaining the strands 624, in order to obtain a better joining of the reinforcing layer 635 and the holding band 630. Moreover, the temperature of the extruded polymer is increased in order to decrease the viscosity thereof, so that it can also penetrate into the strands 624 of fibers 636. The mechanical bonds between the reinforcing layer 635 and the holding band 630 are accordingly reinforced, after the polymer is cooled. The reinforcing layer 635 is centered on the holding band 630 and extends over a width 6L2 substantially lower than the width 6L1 of the holding band 630. Advantageously, the thickness 6E2 of the reinforcing layer 635 is higher than one-third of the thickness 6E1 of the holding band 630 and preferably higher than half thereof. Thus, this thickness criterion, which indirectly conditions the overall inertia of the covered holding layer 630, similarly conditions the bending strength. Moreover, the elastic modulus (Young's modulus) of the polymer material, here of the polyamide 11, is higher than 300 MPa at ambient temperature.

However, according to a particular implementation, according to this third alternative embodiment, the two opposite faces of the holding band 630 are to be covered with a reinforcing layer 635. In this way, the two opposite faces of the holding band 630 can be protected from wear by friction. Moreover, the holding band 630 has a higher bending stiffness and in consequence a higher fatigue strength.

Figure 7:
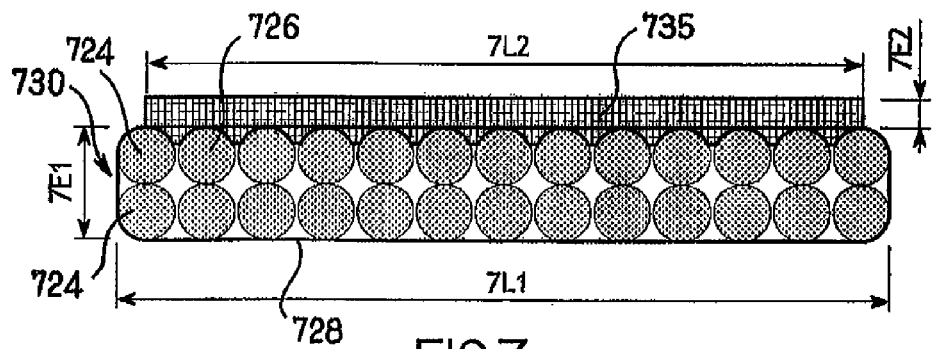
FIG. 7 is a schematic view of a cross section of the element partially shown in FIG. 2 and covered, according to a fourth alternative embodiment.

According to a fourth alternative embodiment shown in FIG. 7, a holding band 730 consists of several superimposed layers and in the present case of two superimposed layers of strands 724 of fibers 726 joined together by suitable retaining means 728. In this way, the mechanical tensile strength of the holding band 730 is increased in comparison with the monolayer holding bands of the abovementioned alternative embodiments.

The holding band 730 is covered with a reinforcing layer 735 substantially similar to the reinforcing layer 635 covering the monolayer holding band 630 shown in FIG. 6.

Moreover, advantageously, an anti-wear polymer layer may be inserted between the outer lap of traction armor 14 and the holding layer 12. This solution increases the service life of the holding layer 12, on the one hand by eliminating the wear in contact with the metal armor, and, on the other hand, by reducing the abovementioned fatigue mechanism. The anti-wear layers, which are well known to a person skilled in the art, are generally prepared by helical winding of one or more tapes obtained by extrusion of a polymer based on polyamide, polyolefins, or PVDF (polyvinylidene fluoride). Reference can also be made to document WO2006/120320 which describes anti-wear layers consisting of tapes of polysulfone (PSU), polyethersulfone (PES), polyphenylsulfone (PPSU), polyetherimide (PEI), polytetrafluoroethylene (PTFE), polyetheretherketone (PEEK) or phenylene polysulfide (PPS). In the alternatives not shown, in which a holding layer is placed between the two traction armor laps 14, 16, it would be advantageous to insert two anti-wear layers respectively in contact with the inner and outer faces of this holding layer, in order to prevent the polymer fibers of this holding layer to be in direct contact with one of these two armor laps.

With regard to the methods for producing covered holding bands, three other preparation methods not shown can be implemented.

According to a first of the other preparation methods, and resuming the installation shown in FIG. 3, the polymer material is extruded directly on the holding band, on the two opposite faces, and a fiber voile and a thermoplastic polyamide film are applied in succession to each of these two opposite faces. The five-layer assembly is then calendered and cooled. In this way, the fiber voiles are sandwiched between the extruded polymer in the course of setting, and the thermoplastic polyamide film; and when the combination is hot-calendered, the polyamide film softens and, under the effect of the pressure applied by the calender, at least partially passes through the fiber voile to join the polymer material. Thus, the polymer material and the polyamide of the film tend to form a single face and accordingly imprison the fiber voile. This complex structure serves to obtain a high bending stiffness of the covered holding band.

According to the second preparation method, on each of the two opposite faces of the holding band a fiber voile and a polyamide film are applied in succession, the combination then being hot-calendered. In this way, while passing through the calender and with an appropriate adjustment of the calendering temperature, the polyamide films soften to form a single face that passes through the fiber voiles, and also which flows across the fibers of the strands of the holding band. This method has the advantage of not requiring relatively costly and bulky extrusion means.

According to the third other preparation method, the polymer covering of the holding band is carried out by a thermoplastic powder deposition method followed by a hot-calendering step. The band, previously charged with static electricity, is first immersed in a chamber containing a fluidized bed of fine polymer particles in suspension in compressed air. During this step, due to the attractive force due to the electrostatic charges, the band is covered with a layer of said fine particles. During the next hot-calendering step, the layer of fine polymer particles is softened, melted and thus joined to the fiber strands of the band. This method also has the advantage of eliminating the need for extrusion means.

The invention claimed is:

1. A subsea flexible pipe for transporting oil and gas, said flexible pipe comprising, from the inside to the outside, an inner impervious sheath, at least one lap of traction armor wound around said inner impervious sheath, a deformable holding layer comprising at least one flexible holding band wound around said lap of traction armor, and at least one tubular structure surrounding said holding layer;

said holding band comprising strands of fibers, said strands being oriented substantially in the longitudinal direction of said holding band; and said holding band is covered with a reinforcing layer of polymer material operative to increase the deformation resistance of said holding layer, wherein said holding band and said reinforcing layer only partially penetrate into one another.

2. The subsea flexible pipe as claimed in claim 1, wherein said fibers have an elastic modulus higher than 50 GPa at ambient temperature.

3. The subsea flexible pipe as claimed in claim 1, wherein said fiber strands comprise core fibers surrounded by surface fibers, a portion of said surface fibers is embedded in said polymer material of said reinforcement layer and operative to join said reinforcing layer to said holding band.

4. The subsea flexible pipe as claimed in claim 1, wherein said holding band further comprises retaining elements configured and placed for holding said fiber strands together.

5. The subsea flexible pipe as claimed in claim 4, wherein said retaining elements comprise said strands extending across a direction of extension of said fiber strands.

6. The subsea flexible pipe as claimed in claim 1, wherein said fibers of said strands are held together against one another.

7. The subsea flexible pipe as claimed in claim 1, wherein said holding band comprises two faces opposite one another, and each of said faces being covered with said reinforcing layer.

8. The subsea flexible pipe as claimed in claim 1, wherein said reinforcing layer forms a sheath around said holding band.

9. The subsea flexible pipe as claimed in claim 1, further comprising a textile layer inserted between said fiber strands and said reinforcing layer.

10. The subsea flexible pipe as claimed in claim 1, wherein said polymer material is a thermoplastic.

11. The subsea flexible pipe as claimed in claim 1, wherein said reinforcing layer comprises extruded polymer material.

12. The subsea flexible pipe as claimed in claim 1, wherein said traction armor comprises strips of armor wound around said impervious sheath at an angle to a length dimension of the pipe, such that said armor strips may deform outward due to subsea pressure stressing said pipe along its length, and said holding band being configured to restrain said armor strips from deforming outward.

13. A subsea flexible pipe for transporting oil and gas, said flexible pipe comprising, from the inside to the outside, an inner impervious sheath, at least one lap of traction armor wound around said inner impervious sheath, a deformable holding layer comprising at least one flexible holding band wound around said lap of traction armor, and at least one tubular structure surrounding said holding layer;

said holding band comprising strands of fibers, said strands being oriented substantially in the longitudinal direction of said holding band; and said holding band is covered with a reinforcing layer of polymer material operative to increase the deformation resistance of said holding layer; wherein unfilled, open spaces reside between said strands of said holding band.

* * * * *

UNITED STATES PATENT AND TRADEMARK OFFICE
CERTIFICATE OF CORRECTION

PATENT NO.       : 8,640,739 B2                                                                Page 1 of 1
APPLICATION NO.  : 12/531984
DATED            : February 4, 2014
INVENTOR(S)      : Do et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 830 days.

Signed and Sealed this
Twenty-second Day of September, 2015

Michelle K. Lee
*Director of the United States Patent and Trademark Office*